3,538,748
APPARATUS FOR DETERMINING CONTAMINATION OF FLOWING LIQUIDS IN A PIPE
Russell Frederick Linsell, Lymington, and George Parsley, Southampton, England, assignors to Esso Research and Engineering Company, a corporation of Delaware
Filed May 6, 1968, Ser. No. 726,764
Claims priority, application Great Britain, May 5, 1967, 21,048/67
Int. Cl. G01n 21/04; G01m 3/02
U.S. Cl. 73—61.1    2 Claims

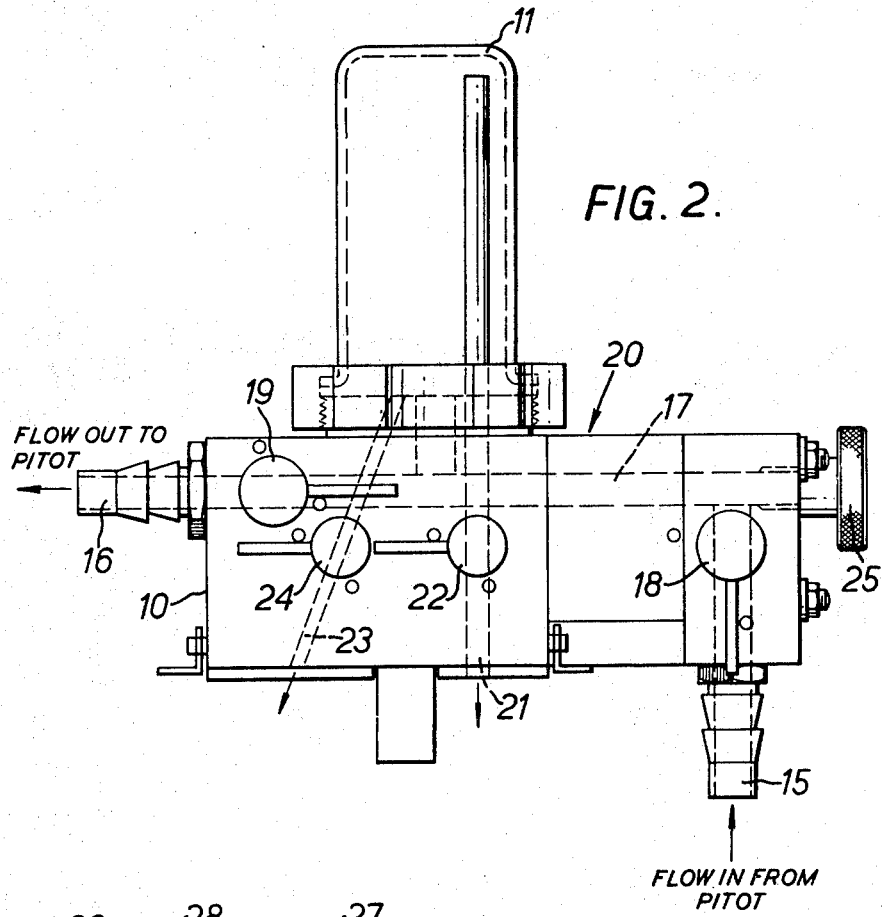
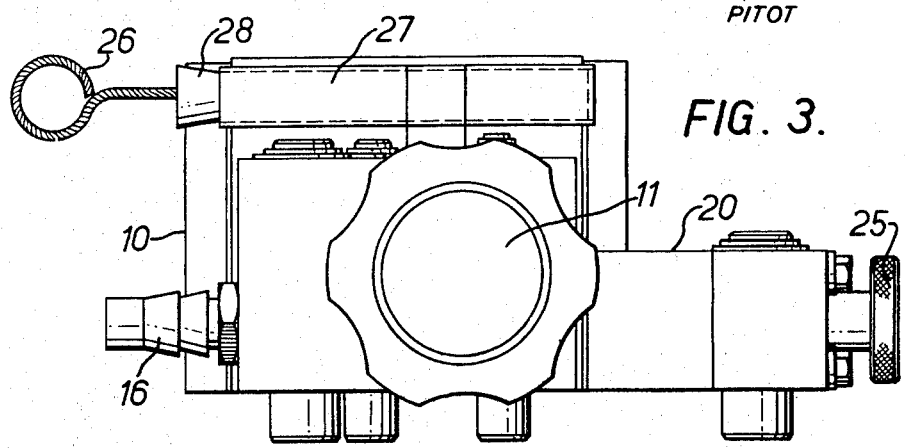

ABSTRACT OF THE DISCLOSURE

A probe having two passages, one facing upstream the other downstream, is suitably inserted into a pipeline so that a pressure differential, between the two openings, is created by the flowing fluid in the pipeline. The difference in pressure allows a small stream of the flowing fluid to flow into the upstream opening and be trapped in a container and examined for contamination. Tubular extensions connect the upstream opening with the container and the container with the downstream opening so as to form a closed flow path.

---

Figure 1:
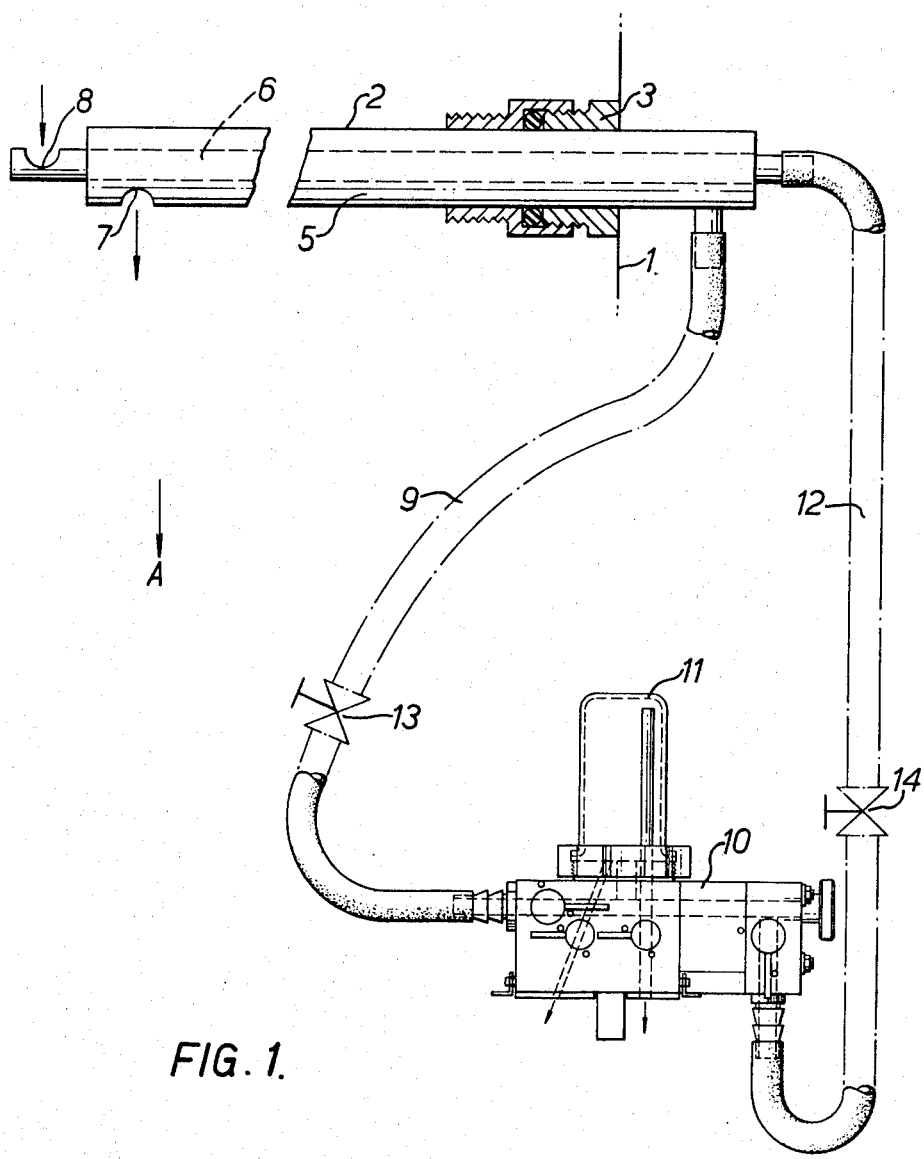

This invention relates to improvements in leak detectors and is applicable to the detection of leaks of gas or liquid into a flowing liquid. The invention is particularly useful for detecting the contamination of cooling water in pipes by products lighter than water, for example the detection of the leakage of hydrocarbon products into the cooling water of condensers in oil refinery operations. The invention consists in a method of detecting leaks and apparatus for carrying out the method.

In accordance with the method of the invention a probe, provided with at least two passages, each having an opening, is inserted, suitably through a gland and valve, into a pipe carrying the flowing liquid so that the opening into one passage in the probe faces upstream, and the opening into the other passage of the probe faces downstream, of the flowing liquid whereby a difference in pressure at the two openings is created by the liquid. This difference in pressure causes a small stream of flowing liquid to be tapped off from the main stream and it is circulated via one passage of the probe to a detecting device and returned via the other passage to the main stream of the flowing liquid; contaminating gas or liquid, which is insoluble in, or immiscible with, the flowing liquid being trapped and concentrated in the detecting device. The detecting device suitably consists of a container, preferably transparent, or provided with a transparent section, and, when contaminants that are of lighter specific gravity than the effluent liquid pass into this container they tend to move to the top of the container and become concentrated thus providing evidence of leaking into the effluent stream. Thus, in the case of a cooling water condenser used for cooling hydrocarbon products in an oil refinery, hydrocarbon liquid which has leaked into the cooling water will float to the top of water by-passed to the detecting container and will concentrate there; if the hydrocarbon products are gaseous their presence will be shown by the bubbling of gas through the water in the container. It is preferred to interpose the detecting device between lengths of flexible, e.g. rubber, tubing attached to the respective passages of the probe and to make these flexible tubes of sufficient length to enable the detecting device to be positioned for convenient inspection by an operator. The detecting device preferably, is mounted so that its position may be altered, e.g. so that it may be reversed; this is useful when monitoring a liquid flowing under sub-atmospheric pressure as hereinafter referred to.

Apparatus for use in the method of the invention comprises a probe having at least two passages each provided with an opening, which is adapted to be inserted into a pipe so that one opening faces upstream, and the other downstream, of liquid flowing in the pipe and to be attached in liquid tight relationship with the wall of the pipe; each of the probe passages is provided with a tubular extension having a detecting device connected between these extensions whereby a gas or liquid flow path is provided between the passages in the probe. The tubular extensions and the detecting device are arranged to be located externally of the pipe carrying the flowing liquid. The detecting device, preferably, is a transparent container mounted on a support connected to each of the tubular extensions. The support is provided with a flow path between the tubular extensions and the transparent container. Preferably there is provided means to drain the container. It is also preferred that the support be rotatably mounted so that the container may be rotated, if desired, e.g. to insert it, and also to provide tubular extensions that are flexible to enable a suitable positioning of the container to be selected; valves or pinch-cocks may be provided to isolate the tubular extensions from the probe and from the container.

The invention is illustrated by reference to the accompanying drawings in which:

FIG. 1 is a diagrammatic, part sectional, representation of a probe and detecting device FIG. 2 is a longitudinal elevation of a detecting device and FIG. 3 is a plan view of a detecting device.

In the drawings, 1 indicates a pipe through which liquid is adapted to flow in the direction indicated by the arrow A. A probe, in the form of a pitot tube 2, is screwed into the pipe 1 through a gland 3 which is screwed into a vent valve. The tube 2 is provided with passages 5 and 6; the passage 5 has an opening 7 downstream of liquid flowing in the tube 1 and the passage 6 has an opening 8 upstream of the said liquid. Liquid, caused to circulate through the tube 2 by the difference in pressure at the openings 7 and 8, circulates from the passage 6 through a conduit 12 suitably a flexible tube, to a detecting device consisting of a support which carries a container 11, and thence through a conduit 9 to the passage 5 of the tube 2. The conduits 9 and 12 may be provided with closure means, e.g. pinch cocks 13 and 14.

Referring now to FIGS. 2 and 3 the support 10, carrying the container 11 is provided with connectors 15 and 16 for connection to tubes 12 and 9 respectively. Within the support 10 is a flow path 17 communicating with the inlets of connectors 15 and 16 and with the container 11. Flow through the support 10 is controlled by an inlet cock 18 and an outlet cock 19. In the form of support shown in FIG. 2 there is provided a transparent section 20, formed, e.g., of a transparent plastics material which provides a visual flow indicator. Means for venting the container 11 comprise an air/gas vent 21 controlled by a vent cock 22. The container 11 is drained through a drain passage 23 controlled by a drain cock 24. The flow passage 17 may be cleaned by removing a plug 25 and for cleaning there is provided and conveniently housed in the support 10, a bottle brush 26 housed in a recess 27; 28 is a stopper.

In the operation of the invention a portion of the liquid flowing through the pipe 1 enters the orifice 8 in the tube 2 and flows through passage 6 and conduit 12 into the support 10 and container 11 and through the passage 17 and hence through conduit 9, passage 5 and opening 7 to return to pipe 1. Contaminating material of lighter specific gravity than the liquid flowing in pipe 1 will concentrate in the container 11 and its presence can be ascertained by visual observation or other detection means, or by sampling. As shown in FIG. 2 the container 11 may be vented of air or gas through the vent 21, controlled by the cock 22 and drained through the passage 23 controlled by the cock 24.

By providing conduits 9 and 12 of appropriate length the container 11 may be positioned at a convenient location obviating the necessity to clamber up pipework to operate valves and cocks and make inspections in pipes above the ground. The invention also permits continuous leak detection to be carried out although, if appropriate, this may be done intermittently.

Where the pressure of the liquid circulating through the pipe 1 is sub-atmospheric, the container 11 may not fill when in the upright position; in this case it is desirable to invert the container 11 so that it lies below the support, 10 to begin with, by simply turning the support downwards when the container 11 will fill with liquid and will remain full when returned to its upright position. A test of short duration is then possible until the transparent container fills with air disengaged from the water by the sub-atmospheric pressure. Thus, although monitoring for sub-atmospheric pressure conditions is not continuous, a test is easily carried out at ground level whenever required. Previously it was not possible to carry out such a test when the liquid was circulating at subatmospheric pressure.

Flow through the passage 17 may be visually observed through the transparent section 20. The passage 17 is easily cleaned by removing the plug 25 and introducing a cleaning means such as a bottle brush 26 which is conveniently housed in the support 10 as shown at 27 in FIG. 3.

What we claim is:

1. Apparatus for determining contamination of flowing liquids in a pipe comprising a probe having at least two passages each provided with an opening, the probe being adapted to be inserted into the pipe so that one opening faces upstream and the other downstream of liquid flowing in the pipe and to be attached in liquid tight relationship with the wall of the pipe, flexible tubular extensions of each of the said passages, a detecting device comprising a transparent container mounted on a support connected to each of the said tubular extensions, a flow path in the support between the connections to the tubular extensions and the transparent container, means to isolate the container, and means to drain the container comprising a drain passage and a valve disposed in said drain passage, said detecting device connected between said tubular extensions whereby a gas or liquid flow path is provided between the said two passages, the tubular extensions and detecting device being arranged to be located externally of the pipe carrying the flowing liquid when the apparatus is in use and whereby the positioning of the container and its support may be adjusted.

2. Apparatus as claimed in claim 1 wherein the said support may be rotated whereby the said container may be inverted.

References Cited

UNITED STATES PATENTS

| 2,592,464 | 4/1952 | Plank | 73—422 |
| 2,655,893 | 10/1953 | Cox et al. | |
| 3,308,669 | 3/1967 | Grise et al. | 73—422 |
| 3,336,791 | 8/1967 | Malone. | |

LOUIS R. PRINCE, Primary Examiner

H. C. POST III, Assistant Examiner

U.S. Cl. X.R.

73—40.5, 422